(12) United States Patent
McNally

(10) Patent No.: US 9,180,555 B2
(45) Date of Patent: Nov. 10, 2015

(54) ADJUSTABLE CLAMSHELL ASSEMBLY FIXTURE

(75) Inventor: John T. McNally, Berkley, MI (US)

(73) Assignee: Magna International Inc., Aurora, Ontario (CA)

( * ) Notice: Subject to any disclaimer, the term of this patent is extended or adjusted under 35 U.S.C. 154(b) by 1083 days.

(21) Appl. No.: 13/243,061

(22) Filed: Sep. 23, 2011

(65) Prior Publication Data

US 2012/0073353 A1   Mar. 29, 2012

Related U.S. Application Data

(60) Provisional application No. 61/385,724, filed on Sep. 23, 2010.

(51) Int. Cl.
| B23K 37/04 | (2006.01) |
| B21D 39/02 | (2006.01) |
| B25B 1/24 | (2006.01) |

(52) U.S. Cl.
CPC .......... B23K 37/0435 (2013.01); B21D 39/028 (2013.01); *B23K 37/0452* (2013.01); *B23K 2201/006* (2013.01); *B25B 1/2415* (2013.01)

(58) Field of Classification Search
CPC .... B21D 39/02; B21D 39/026; B21D 39/028; H01R 43/048; B25B 1/06; B25B 5/06; B25B 1/2478; B25B 1/2415; B25B 1/2484; B23K 37/04; B23K 37/0435; B23K 37/0452
USPC ............. 72/407, 409.01, 409.16; 29/509, 514
See application file for complete search history.

(56) References Cited

U.S. PATENT DOCUMENTS

| 3,064,706 | A | * | 11/1962 | Ehmann | 72/407 |
| 3,094,702 | A | * | 6/1963 | Haucke et al. | 72/402 |
| 3,314,135 | A | * | 4/1967 | Smith | 29/751 |
| 3,783,673 | A | * | 1/1974 | Andresen | 72/407 |
| 3,871,224 | A | * | 3/1975 | Hilton | 72/413 |
| 5,787,754 | A | * | 8/1998 | Carrion et al. | 72/407 |
| 5,878,614 | A | * | 3/1999 | Okamoto | 72/52 |
| 5,987,950 | A | * | 11/1999 | Horton | 72/58 |
| 6,058,592 | A | * | 5/2000 | Cadwallader et al. | 29/559 |
| 6,095,507 | A | * | 8/2000 | Brown et al. | 269/34 |
| 6,792,789 | B1 | * | 9/2004 | Faucher | 72/456 |
| 7,243,516 | B2 | * | 7/2007 | Zusi | 72/20.1 |
| 2006/0123875 | A1 | * | 6/2006 | Oxley et al. | 72/407 |

* cited by examiner

*Primary Examiner* — Edward Tolan
(74) *Attorney, Agent, or Firm* — Dickinson Wright PLLC

(57) ABSTRACT

A system for forming different types of clamshell components including a moveable base, a stationary base, and a squeezer assembly capable of accommodating different types of clamshell components having different lengths, shapes, locations of piercings. The squeezer assembly includes interchangeable squeezer elements. To switch between forming a first type of clamshell component and a second type of clamshell component, one of the two bases is moved relative to the other of the two bases and/or squeezer units for forming the first type of clamshell component are replaced with squeezer units for forming the second type of clamshell component. Reconfiguring the bases and interchanging the squeezers of a clamshell tool, instead of replacing an entire clamshell tool with a different clamshell tool, minimizes lost productivity time, reduces capital costs, and eliminates the problem of storing several different clamshell assembly tools.

10 Claims, 12 Drawing Sheets

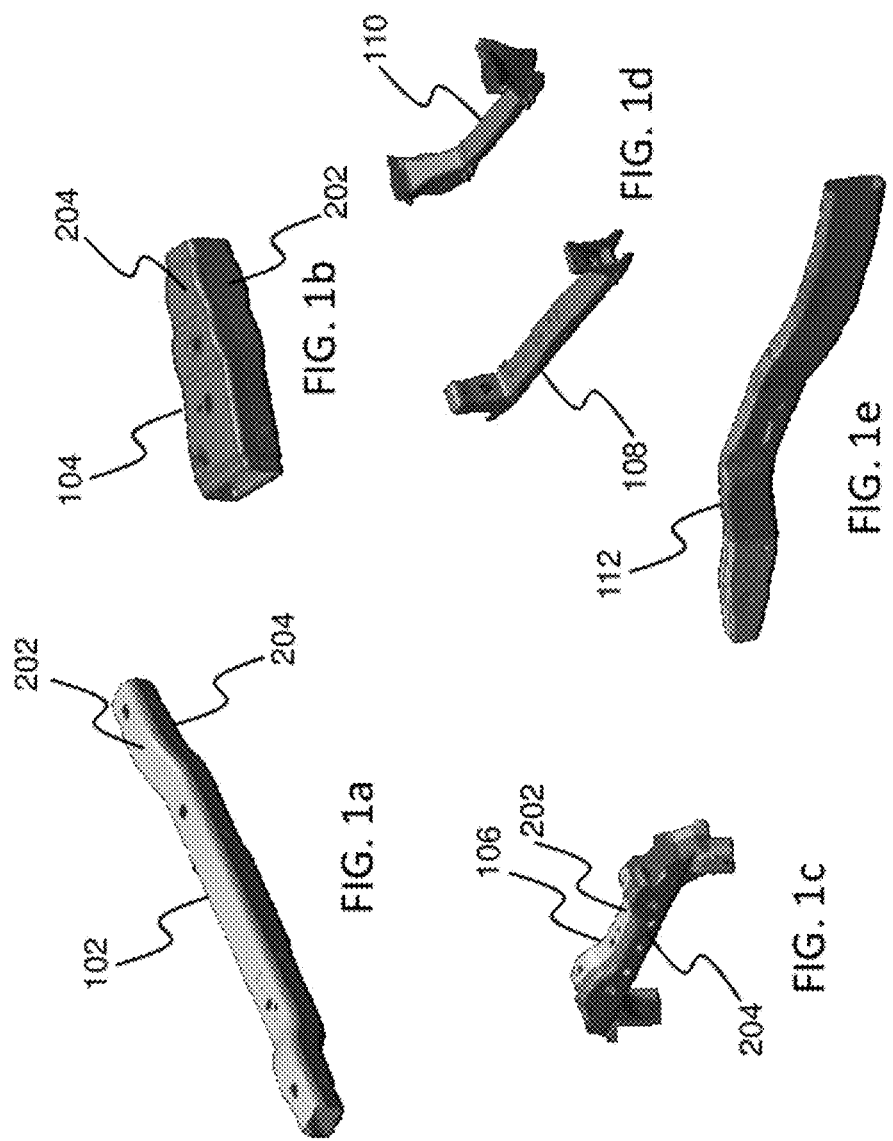

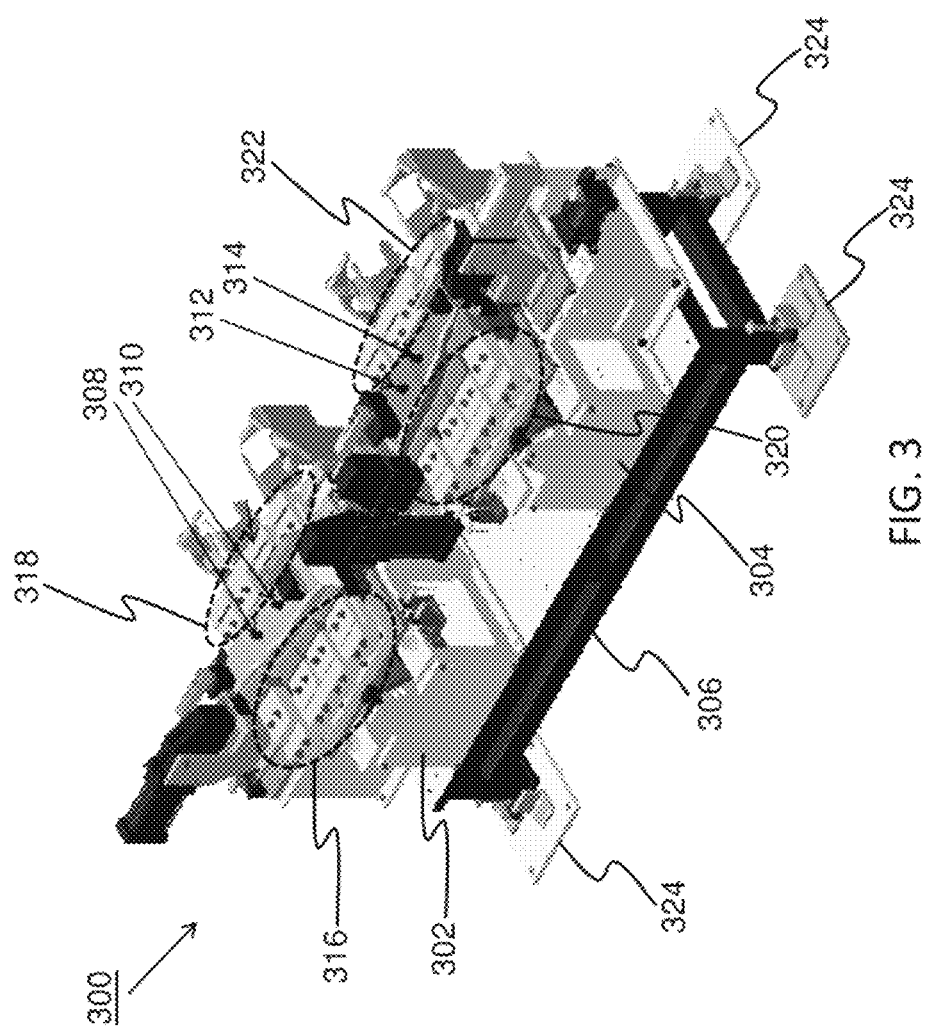

ADJUSTABLE CLAMSHELL ASSEMBLY FIXTURE

CROSS REFERENCE TO RELATED APPLICATIONS

This application claims the benefit of U.S. Provisional Patent Application No. 61/385,724, filed on Sep. 23, 2010, the entire contents of which are incorporated herein by reference.

FIELD OF THE INVENTION

The instant invention relates generally to the field of assembly fixtures, and more particularly to the field of assembly fixtures for automotive clamshell components.

BACKGROUND OF THE INVENTION

In the automotive industry, vehicles are mass-produced using complex assembly line processes, in which each vehicle is assembled together as it passes through a plurality of different assembly stations. Separate assembly lines may also be provided for assembling vehicle sub-assemblies and components, which are subsequently incorporated into one of the vehicles that is being assembled on the main assembly line. Typically, a single type of vehicle includes many different types of clamshell components, which may be used in engine cradles, as frame cross-members, etc.

In the case of clamshell components, typically upper and lower shells, which may or may not be substantially identical to each other, are aligned and joined together along overlapping edge portions or flanges. A few specific and non-limiting examples of common joining techniques include metal inert gas (MIG) welding and spot welding. Different types of clamshell components may have different lengths, different contours along one or more of the outer surfaces, different spacing between piercings, etc. In order to ensure that the upper and lower shells are joined securely one to the other, overlapping edge portions of the upper and lower shells are pressed together using squeezers that are customized for the particular component being formed, and the joining is performed during squeezing. In particular, the squeezers are customized to conform closely to the contours along the overlapping edge portions of the upper and lower shells, so as to avoid forming any gaps along the resulting joint.

Prior art strongback machines have squeezers that squeeze the clamshell components along the weld face, in order to close gaps in clamshell components as described above. These machines are custom-built, and are not re-usable for different components. In particular, such strongback machines do not accommodate variable widths, heights, and/or lengths for manufacturing various clamshell components. Of course, high tooling costs are associated with the purchase of custom tools for forming each of a plurality of different clamshell components. Further, whenever a different clamshell component needs to be manufactured there is lost production time associated with switching out one strongback machine and replacing it with a different strongback machine that supports production of the different clamshell component. Further still, storing a plurality of different strongback machines consumes floor-space within manufacturing facilities and may contribute to unsafe working conditions.

It is desirable to provide a clamshell assembly fixture that overcomes at least some of the above-mentioned limitations of the prior art.

SUMMARY OF EMBODIMENTS OF THE INVENTION

In accordance with an aspect of at least one embodiment of the instant invention, there is provided a system for forming a plurality of different types of clamshell components, comprising: a plurality of interchangeable squeezer units comprising a first pair of squeezer units for use during forming of a first type of clamshell component and a second pair of squeezer units for use during forming of a second type of clamshell component, each squeezer unit having a first mounting structure and having a contacting surface; a squeezer having a pair of second mounting structures, each one of the pair of second mounting structures capable of detachably coupling to the first mounting structure of one of the squeezer units of the first pair of squeezer units during forming of the first type of clamshell component and for detachably coupling with the first mounting structure of one of the squeezer units of the second pair of squeezer units during forming of the second type of clamshell component; a support assembly comprising a first locator member and a second locator member, the first locator member controllably movable relative to the second locator member, the support assembly being adjustable between a first configuration in which the first locator member and the second locator member are disposed one relative to the other for locating first and second parts of the first type of clamshell component between the contacting surfaces of the first pair of squeezer units and a second configuration in which the first locator member and the second locator member are disposed one relative to the other for locating first and second parts of the second type of clamshell component between the contacting surfaces of the second pair of squeezer units; and, a drive mechanism, coupled to the squeezer, for moving the squeezer units of the first pair of squeezer units one toward the other such that the contacting surfaces thereof are brought into contact with at least one of the first and second parts of the first type of clamshell component during forming of the first type of clamshell component, and for moving the squeezer units of the second pair of squeezer units one toward the other such that the contacting surfaces thereof are brought into contact with at least one of the first and second parts of the second type of clamshell component during forming of the second type of clamshell component.

A method for forming a plurality of different types of clamshell components, comprising: supporting first and second parts of a first type of clamshell component such that first and second locator features of each of the first and second parts engage first and second locator members, respectively, of a support assembly, and such that first and second edge portions of the first part are aligned with respective first and second edge portions of the second part in an overlapping arrangement; using a first pair of squeezer units mounted on a squeezer, squeezing together the overlapping first and second edge portions of the first and second parts of the first type of clamshell component; during squeezing, joining the first and second parts of the first type of clamshell component so as to form the first type of clamshell component; moving the first locator member relative to the second locator member so as to reconfigure the support assembly for forming a second type of clamshell component; replacing the first pair of squeezer units with a second pair of squeezer units, the second pair of squeezer units having contacting surfaces that are configured for squeezing together first and second parts of the second type of clamshell component; supporting first and second parts of the second type of clamshell component such that first and second locator features of each of the first and second parts engage the first and second locator members, respectively, of the support assembly, and such that first and second edge portions of the first part are aligned with respective first and second edge portions of the second part in an overlapping arrangement; using the second pair of squeezer units mounted on the squeezer, squeezing together the overlapping first and second edge portions of the first and second parts of the second type of clamshell component; during squeezing, joining the first and second parts of the second type of clamshell component so as to form the second type of clamshell component A method for forming a plurality of different types of clamshell components, comprising: configuring a support assembly for locating first and second parts of a first type of clamshell component such that first and second edge portions of the first part are aligned with respective first and second edge portions of the second part in an overlapping arrangement; using a first pair of squeezer units mounted on a squeezer, squeezing together the overlapping first and second edge portions of the first and second parts of the first type of clamshell component; during squeezing, joining the first and second parts of the first type of clamshell component so as to form the first type of clamshell component; re-configuring the support assembly for locating first and second parts of a second type of clamshell component such that first and second edge portions of the first part are aligned with respective first and second edge portions of the second part in an overlapping arrangement; replacing the first pair of squeezer units with a second pair of squeezer units, the second pair of squeezer units having contacting surfaces that are configured for squeezing together the first and second parts of the second type of clamshell component; using the second pair of squeezer units mounted on the squeezer, squeezing together the overlapping first and second edge portions of the first and second parts of the second type of clamshell component; and, during squeezing, joining the first and second parts of the second type of clamshell component so as to form the second type of clamshell component.

A method for forming a plurality of different types of clamshell components, comprising: providing a support assembly having a first locator member and a second locator member, the second locator member being movable relative to the first locator member; moving the second locator member relative to the first locator member to provide a first predetermined configuration of the support assembly; supporting a first part of a first type of clamshell component on the support assembly, such that a first locator feature of the first part engages the first locator member and a second locator feature of the first part engages the second locator member; supporting a second part of the first type of clamshell component on the support assembly such that a first locator feature of the second part engages the first locator member and a second locator feature of the second part engages the second locator member, and such that first and second edge portions of the first part are aligned with respective first and second edge portions of the second part in an overlapping arrangement; squeezing together the overlapping first and second edge portions of the first and second parts of the first type of clamshell component, using a first pair of squeezer units mounted on a squeezer; during squeezing, joining the first and second parts of the first type of clamshell component so as to form the first type of clamshell component; detaching the first pair of squeezer units from the squeezer; mounting a second pair of squeezer units on the squeezer; moving the second locator member relative to the first locator member to provide a second predetermined configuration of the first locator member and the second locator member; supporting a first part of a second type of clamshell component on the support assembly, such that a first locator feature of the first part engages the first locator member and a second locator feature of the first part engages the second locator member; supporting a second part of the second type of clamshell component on the support assembly such that a first locator feature of the second part engages the first locator member and a second locator feature of the second part engages the second locator member, and such that first and second edge portions of the first part are aligned with respective first and second edge portions of the second part in an overlapping arrangement; squeezing together the overlapping first and second edge portions of the first and second parts of the second type of clamshell component, using the second pair of squeezer units mounted on the squeezer; and, during squeezing, joining the first and second parts of the second type of clamshell component so as to form the second type of clamshell component.

BRIEF DESCRIPTION OF THE DRAWINGS

Exemplary embodiments of the instant invention will now be described in conjunction with the following drawings, wherein like numerals represent like elements, and in which:

FIGS. 1a-1e are perspective views showing exemplary clamshell components;

FIG. 2b is an end view of the generalized clamshell component of FIG. 2a;

FIG. 3 is a perspective view showing a dedicated clamshell tool that is typical of the prior art;

FIG. 4b shows an end view of the exemplary clamshell tool of FIG. 4a;

FIG. 5b shows an end view of the clamshell tool of FIG. 5a;

DETAILED DESCRIPTION OF THE DRAWINGS

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

FIGS. 1a-e present perspective views showing various exemplary and different types of clamshell components. The size, shape, and configuration of clamshell components may vary without limiting the present invention as described below. As is discussed in greater detail below, each of the clamshell components 102-112 includes a first clamshell component part 202 and a second clamshell component part 204. The first clamshell component part 202 and the second clamshell component part 204 are aligned one with the other and then typically joined together along overlapping edge portions. Suitable joining techniques include metal-inert-gas (MIG) welding, spot welding, etc. The first clamshell component 202 and the second clamshell component 204 are fabricated, for instance, by stamp-forming a suitable sheet metal blank using known methods. As is shown in FIGS. 1a-e, different clamshell components can have different lengths, different cross-sectional shapes, different contours, different piercing locations, etc.

Figure 2A:
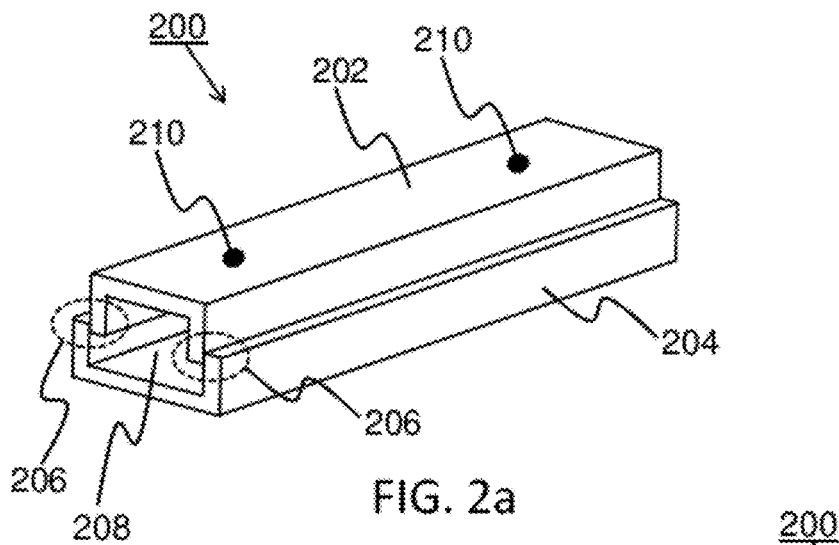
FIG. 2a is a perspective view showing a generalized clamshell component structure.
Figure 2B:
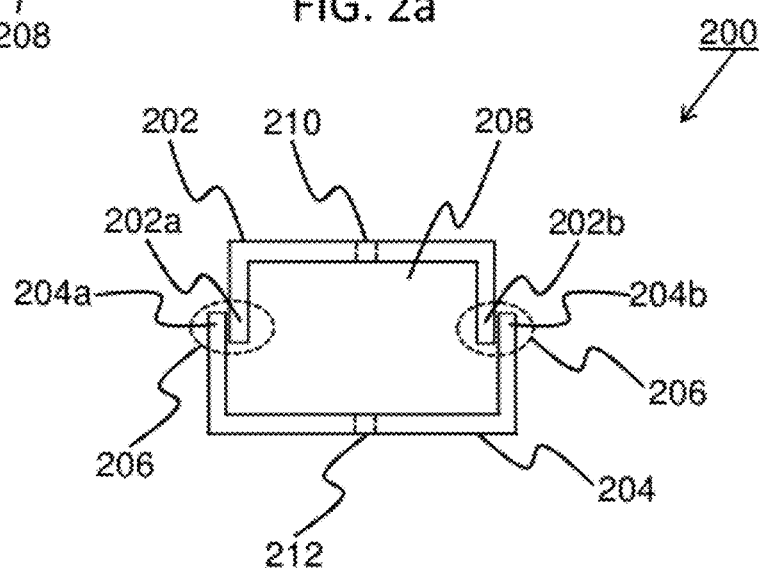

FIG. 2a is a perspective view showing a generalized and simplified structure of a clamshell component 200. FIG. 2b is an end view of the generalized clamshell component 200. The clamshell component 200 includes the first clamshell component part 202 and the second clamshell component part 204. In FIGS. 2a and 2b, the wall thicknesses of the first and second clamshell component parts 202 and 204 have been exaggerated in order to provide improved clarity. In the instant and non-limiting example, the first clamshell component 202 and the second clamshell component 204 are each stamp-formed from a suitable sheet metal blank. As is shown most clearly in FIG. 2b, first and second edge portions 202a and 202b of the first clamshell component 202 are aligned with respective first and second edge portions 204a and 204b of the second clamshell component 204 along an overlapping region 206. The first and second clamshell component parts 202 and 204, respectively, are joined one to the other along the overlapping region 206, such as for instance by MIG welding or spot welding, thereby defining a clamshell component 200 having a central cavity 208.

Referring still to FIGS. 2a and 2b, a first locating hole or holes 210 are provided on the first clamshell component part 202 and a second locating hole or holes 212 are provided on the second clamshell component part 204. The first and second locating holes 210 and 212, respectively, are for use in aligning the first clamshell component 202 relative to the second clamshell component 204, and for supporting the first and second clamshell components during joining thereof.

Referring now to FIG. 3, shown is a perspective view of a dedicated clamshell tool 300 that is typical of the prior art. The clamshell tool 300 includes a first base 302 and a second base 304. The first base 302 and the second base 304 are fixedly mounted to a table 306, such as for instance by bolting or welding. A predetermined separation distance is provided between the first base 302 and the second base 304. The predetermined separation distance is selected for forming a particular clamshell component, and is non-variable. First locator tooling 308 and 310 are provided on the first base 304 and second locator tooling 312 and 314 are provided on the second base 305. During use, one of the second locator holes 212 of the second clamshell component part 204 is aligned with the first locator tooling 308 and 310 and the other one of the second locator holes 212 of the second clamshell component part 204 is aligned with the second locator tooling 312 and 314. Similarly, one of the first locator holes 210 of the first clamshell component part 202 is aligned with the first locator tooling 308 and 310 and the other one of the first locator holes 210 of the first clamshell component part 202 is aligned with the second locator tooling 312 and 314. In this way, the first clamshell component part 202 is aligned with the second clamshell component part 204. Squeezer assemblies 316-322 laterally compress the first and second clamshell component parts, such that adjacent edge portions of the first and second clamshell component parts are brought into contact one with the other. During squeezing, the first and second clamshell component parts are joined together along said adjacent edge portions, such as for instance by one of MIG welding and spot welding.

The clamshell tool 300 is fixedly secured to a ground surface within an assembly station of an assembly line, via four mounting plates 324 (three of the mounting plates 324 are shown in FIG. 3). For instance, the mounting plates 324 are bolted to the floor surface. When different clamshell components are required, the dedicated clamshell tool 300 shown in FIG. 3 is replaced with another dedicated clamshell tool. In particular, the mounting plates 324 are unbolted from the ground surface and the clamshell tool 300 is removed from the assembly station. Another dedicated clamshell tool is moved into place within the assembly station and is bolted to the ground surface. Unfortunately, replacing dedicated clamshell tools results in lost productivity time. Further, it is necessary to purchase, maintain, and store a separate dedicated clamshell tool for every type of clamshell component that is manufactured on an assembly line.

Figure 4A:
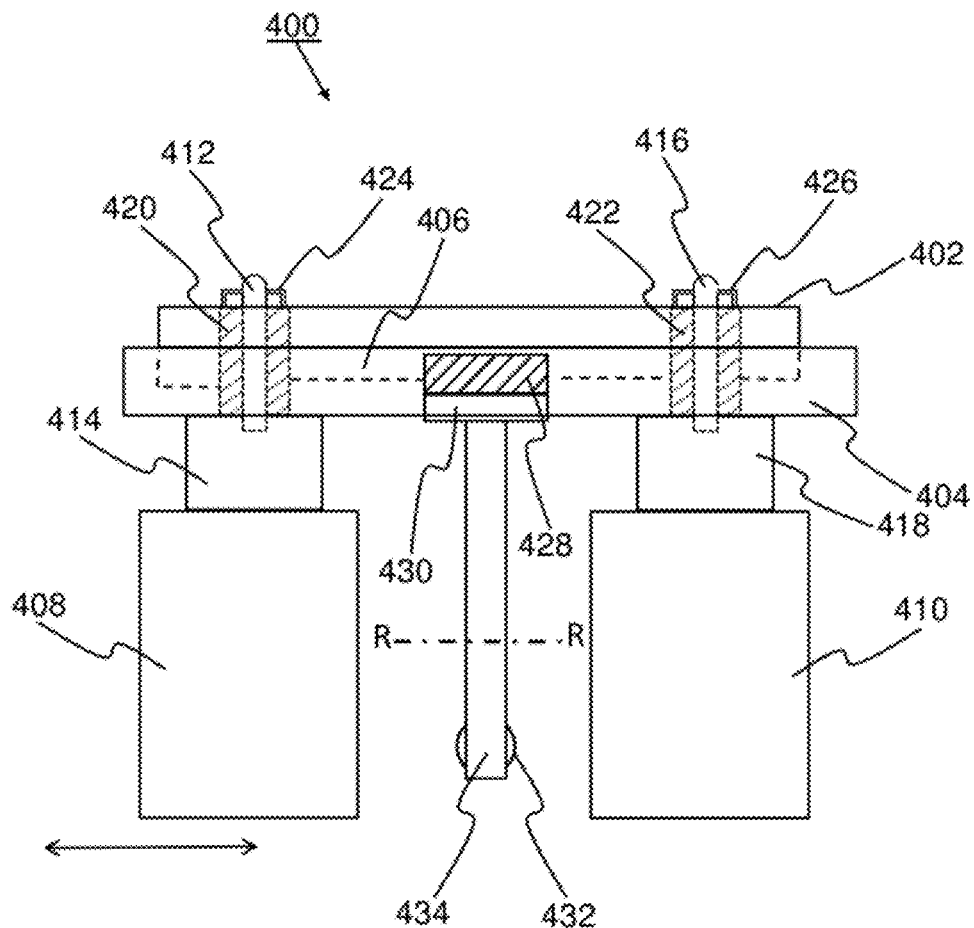
FIG. 4a is a side view of a simplified exemplary clamshell tool according to the present invention.

Referring now to FIG. 4a, shown is a simplified side view of a first exemplary clamshell tool 400 of the instant invention. Also shown in FIG. 4a are a first clamshell component part 402 and a second clamshell component part 404. The first clamshell component part 402 and the second clamshell component part 404 are aligned one relative to the other, with respective edge portions thereof being disposed in an overlapping arrangement within region 406. The clamshell tool 400 includes a first base 408 and a second base 410. As is indicated by the double-headed arrow in FIG. 4a, the first base 408 is movable relative to the second base 410. In the specific and non-limiting example that is shown in FIG. 4a, the first base 408 is movable and the second base 410 is fixed. A first locator member 412 is mounted to the first base 408 via an optional mount 414. Similarly, a second locator member 416 is mounted to the second base 410 via an optional mount 418.

Various mechanisms may be used to move the first base 408 relative to the second base. For instance, one or both of the first and second bases may be mounted on a guide track and coupled to a pneumatic or hydraulic mechanism.

During use, a first (not illustrated in FIGS. 4a and 4b) locator feature of the second clamshell component part 404 is aligned with and engages the first locator member 412, and a second (not illustrated in FIGS. 4a and 4b) locator feature of the second clamshell component part 404 is aligned with and engages the second locator member 416. By way of a specific and non-limiting example, the first and second locator features are the locator holes 212 that are shown in FIG. 2b. After the second clamshell component part 404 is placed on the clamshell tool 400, a first sleeve 420 is placed over the first locator member 412 and a second sleeve 422 is placed over the second locator member 416. Subsequently, a first (not illustrated in FIGS. 4a and 4b) locator feature of the first clamshell component part 402 is aligned with and engages the first locator member 412, and a second (not illustrated in FIGS. 4a and 4b) locator feature of the first clamshell component part 402 is aligned with and engages the second locator member 416. By way of a specific and non-limiting example, the first and second locator features are the locator holes 210 that are shown in FIGS. 2a and 2b. Clips 424 and 426 are placed over the first and second locator members 412 and 416, respectively, for retaining the first clamshell component 402 in the aligned condition relative to the second clamshell component 404.

Referring still to FIG. 4a, the first and second sleeves 420 and 422 have respective first and second lengths for supporting the first clamshell component part 402 relative to the second clamshell component part 404, such that first and second edge portions of the first clamshell component part 402 overlap with respective first and second edge portions of the second clamshell component part 404 within the region 406. In the example that is shown in FIG. 4a, the first and second sleeves 420 and 422 are of equal length. Optionally, the first and second sleeves 420 and 422 may be of unequal length, and the length, size, shape and configuration may vary depending on the desired design of the clamshell component.

Figure 4B:
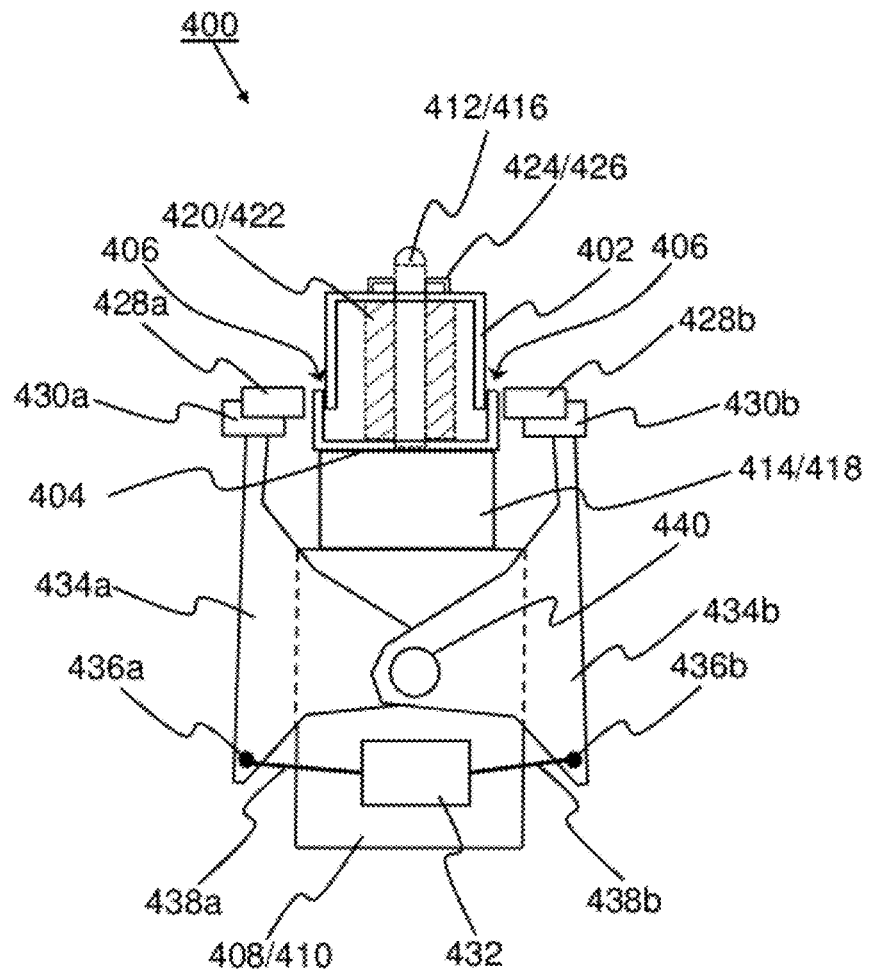

Referring now to FIGS. 4a and 4b, the clamshell tool 400 includes a squeezer assembly having replaceable squeezer elements 428a and 428b detachably mounted to mounting structures 430a and 430b, respectively, proximate a first end of squeezer arms 434a and 434b, respectively. A drive mechanism 432 is coupled to attachment points 436a and 436b at a second end of the squeezer arms 434a and 434b, respectively, via connectors 438a and 438b, respectively. During use the drive mechanism 432 induces a pivoting movement of the squeezer arms 434a and 434b about pivot axis R, which passes through connector 440 in a direction perpendicular to the plane of the drawing sheet. The pivoting movement of the squeezer arms 434a and 434b moves the squeezer elements 428a and 428b between a first position in which the squeezer elements 428a and 428b are spaced apart from the region 406 of the clamshell components 402 and 404, and a second position in which the squeezer elements 428a and 428b are in contact with the region 406 along opposite sides of the aligned clamshell components 402 and 404.

Figure 5A:
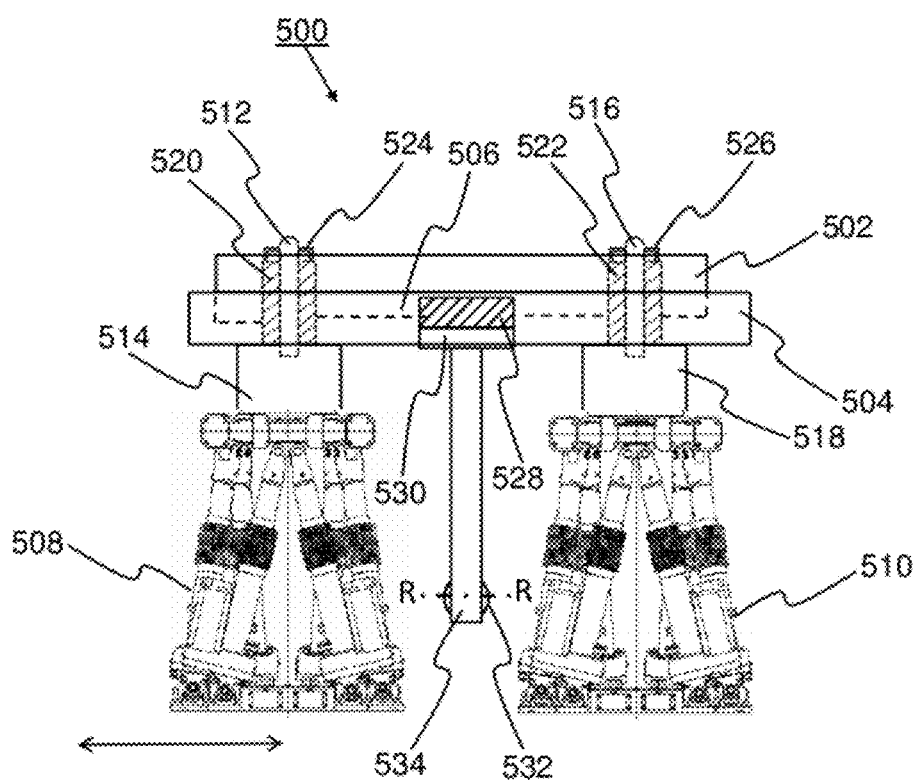
FIG. 5a is a side view of another exemplary clamshell tool according to the present invention.

Referring now to FIG. 5a, shown is a simplified side view of a clamshell tool 500 according to a second embodiment of the instant invention. Also shown in FIG. 5a are a first clamshell component part 502 and a second clamshell component part 504. The first clamshell component part 502 and the second clamshell component part 504 are aligned one relative to the other, with respective edge portions thereof being disposed in an overlapping arrangement within region 506. The clamshell tool 500 includes a first base 508 and a second base 510. Specifically, each one of the first base and the second base is a hexapod robot. The first and second bases 508 and 510, respectively, are height adjustable. Further, as is indicated by the double-headed arrow in FIG. 5a, the first base 508 is movable relative to the second base 510. In the specific and non-limiting example that is shown in FIG. 5a, the first base 508 is movable and the second base 510 is fixed. A first locator member 512 is mounted to the first base 508 via an optional mount 514. Similarly, a second locator member 516 is mounted to the second base 510 via an optional mount 518.

During use, a first (not illustrated in FIGS. 5a and 5b) locator feature of the second clamshell component part 504 is aligned with and engages the first locator member 512, and a second (not illustrated in FIGS. 5a and 5b) locator feature of the second clamshell component part 504 is aligned with and engages the second locator member 516. By way of a specific and non-limiting example, the first and second locator features are the locator holes 212 that are shown in FIG. 2b. After the second clamshell component part 504 is placed on the clamshell tool 500, a first sleeve 520 is placed over the first locator member 512 and a second sleeve 522 is placed over the second locator member 516. Subsequently, a first (not illustrated) locator feature of the first clamshell component part 502 is aligned with and engages the first locator member 512, and a second (not illustrated) locator feature of the first clamshell component part 502 is aligned with and engages the second locator member 516. By way of a specific and non-limiting example, the first and second locator features are the locator holes 210 that are shown in FIGS. 2a and 2b. Clips 524 and 526 are placed over the first and second locator members 512 and 516, respectively, for retaining the first clamshell component 502 in the aligned condition relative to the second clamshell component 504.

Referring still to FIG. 5a, the first and second sleeves 520 and 522 have respective first and second lengths for supporting the first clamshell component part 502 relative to the second clamshell component part 504, such that first and second edge portions of the first clamshell component part 502 overlap with respective first and second edge portions of the second clamshell component part 504 within the region 506. In the example that is shown in FIG. 5a, the first and second sleeves 520 and 522 are of equal length. Optionally, the first and second sleeves 520 and 522 are of unequal length.

Figure 5B:
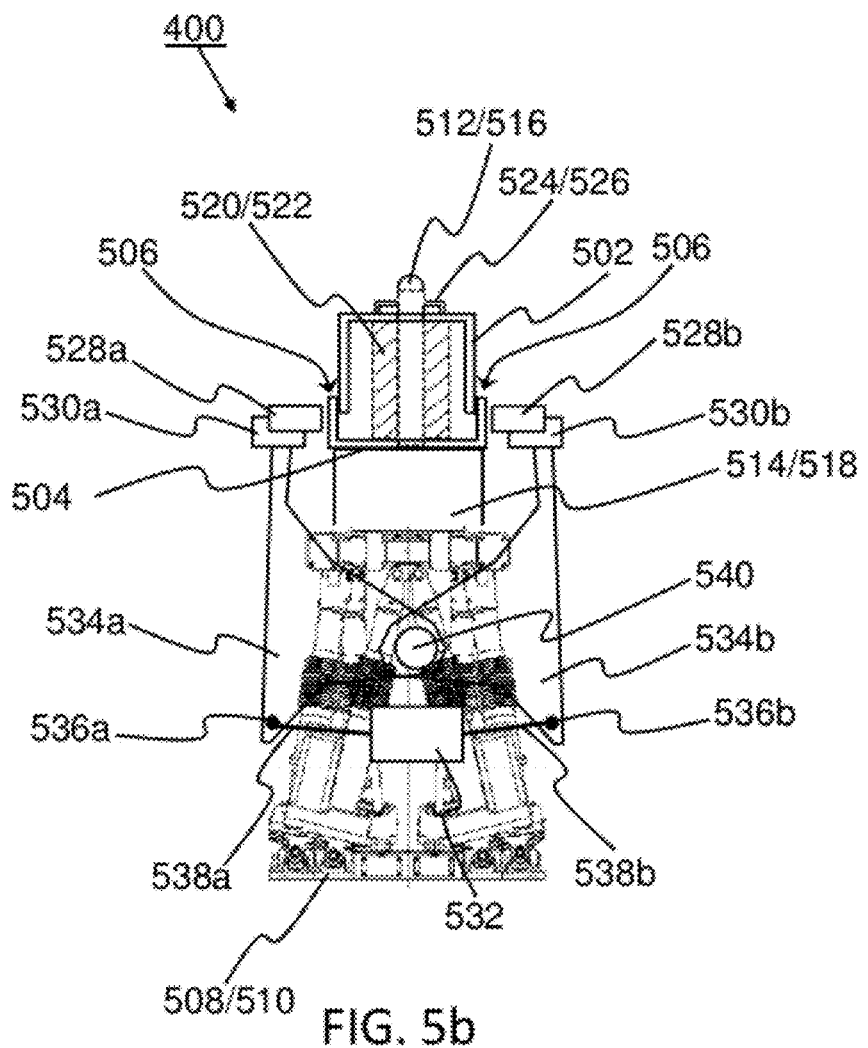

Referring now to FIGS. 5a and 5b, the clamshell tool 500 includes a squeezer assembly having replaceable squeezer elements 528a and 528b detachably mounted to mounting structures 530a and 530b, respectively, proximate a first end of squeezer arms 534a and 534b, respectively. A drive mechanism 532 is coupled to attachment points 536a and 536b at second end of the squeezer arms 534a and 534b, respectively, via connectors 538a and 538b, respectively. During use the drive mechanism 532 induces a pivoting movement of the squeezer arms 534a and 534b about pivot axis R, which passes through connector 540 in a direction perpendicular to the plane of the drawing sheet. The pivoting movement of the squeezer arms 534a and 534b moves the squeezer elements 528a and 528b between a first position in which the squeezer elements 528a and 528b are spaced apart from the region 506 of the clamshell components 502 and 504, and a second position in which the squeezer elements 528a and 528b are in contact with the region 506 along opposite sides of the aligned clamshell components 502 and 504.

Figure 6A:
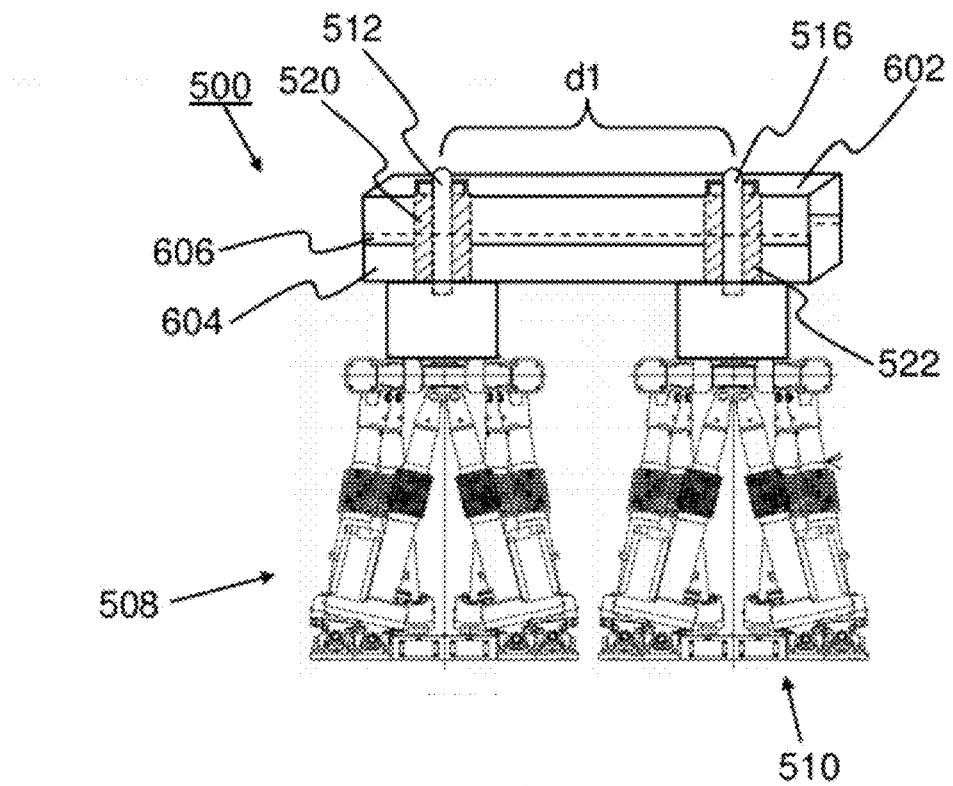
FIG. 6a is a side view showing the clamshell tool of FIGS. 5a-b in a first configuration for forming a first exemplary type of clamshell component.

FIG. 6a is a simplified side view showing the clamshell tool 500 of FIGS. 5a-b in a first configuration for forming of a first type of clamshell component. In order to provide improved clarity, the squeezer assembly elements have been omitted from this drawing. As shown in FIG. 6a, the first and second locator members 512 and 516 are separated by a first distance d1 for accommodating first and second clamshell component parts 602 and 604 of the first type of clamshell component. Further, the first and second locator members 512 and 516 are positioned approximately at the same height. During use, not illustrated locator features of the first and second clamshell component parts 602 and 604 are aligned with the first and second locator members 512 and 516. First and second sleeves 520 and 522, which are positioned on the first and second locator members, respectively, support the first clamshell component 602 at a predetermined spacing relative to the second clamshell component 604, such that respective first and second edge portions thereof are disposed in an overlapping arrangement within the region 606.

Figure 6B:
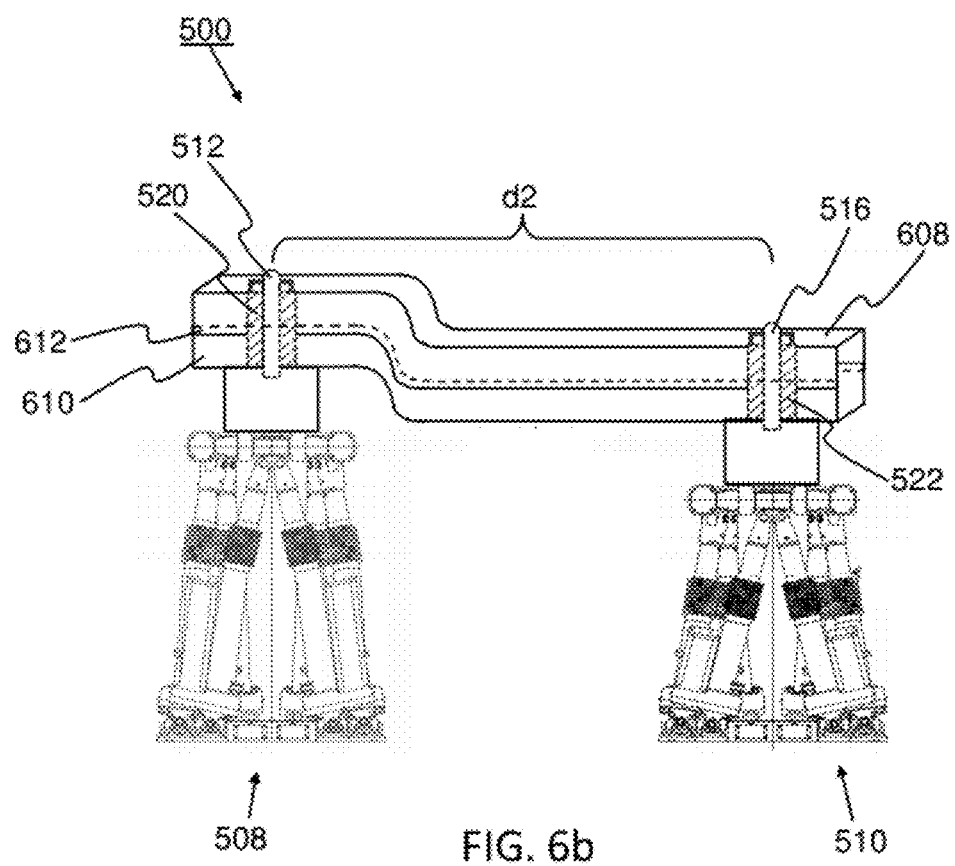
FIG. 6b is a side view showing the clamshell tool of FIGS. 5a-b in a second exemplary configuration for forming a second type of clamshell component.

FIG. 6b is a simplified side view showing the clamshell tool 500 of FIGS. 5a-b in a second configuration for forming of a second type of clamshell component. In order to provide improved clarity, the squeezer assembly elements have been omitted from this drawing. As shown in FIG. 6b, the first and second locator members 512 and 516 are separated by a second distance d2 for accommodating first and second clamshell component parts 608 and 610 of the second type of clamshell component. Further, the first and second locator members 512 and 516 are positioned at different heights. In the instant example, the distance d2 is greater than the distance d1 and the first locator member 512 is elevated above the level of the second locator member 516. During use, not illustrated locator features of the first and second clamshell component parts 608 and 610 are aligned with the first and second locator members 512 and 516. First and second sleeves 520 and 522, which are positioned on the first and second locator members, respectively, support the first clamshell component 608 at a predetermined spacing relative to the second clamshell component 610, such that respective first and second edge portions thereof are disposed in an overlapping arrangement within the region 612.

Referring still to FIGS. 6a and 6b, and assuming that the distances d1 and d2 represent minimum and maximum spacing distances between the first and second locator element 512 and 516, respectively, the first and second bases can be moved to different positions for providing different spacing d3, d4, d5 . . . etc. Similarly, the height of the first locator member 512 relative to the height of the second locator member 516 can be varied. Accordingly, the clamshell tool 500 can be reconfigured to support production of a wide variety of different types of clamshell components. Of course, in an analogous manner the first base 408 of the clamshell tool 400 can be moved relative to the second base 410 in order to vary a distance between the first locator member 412 and the second locator member 416. When the bases 408 and/or 410, and/or the optional mounts 414 and/or 418 support height adjustment, then the height of the first locator member 412 relative to the second locator member 416 can also be varied.

Figure 7:
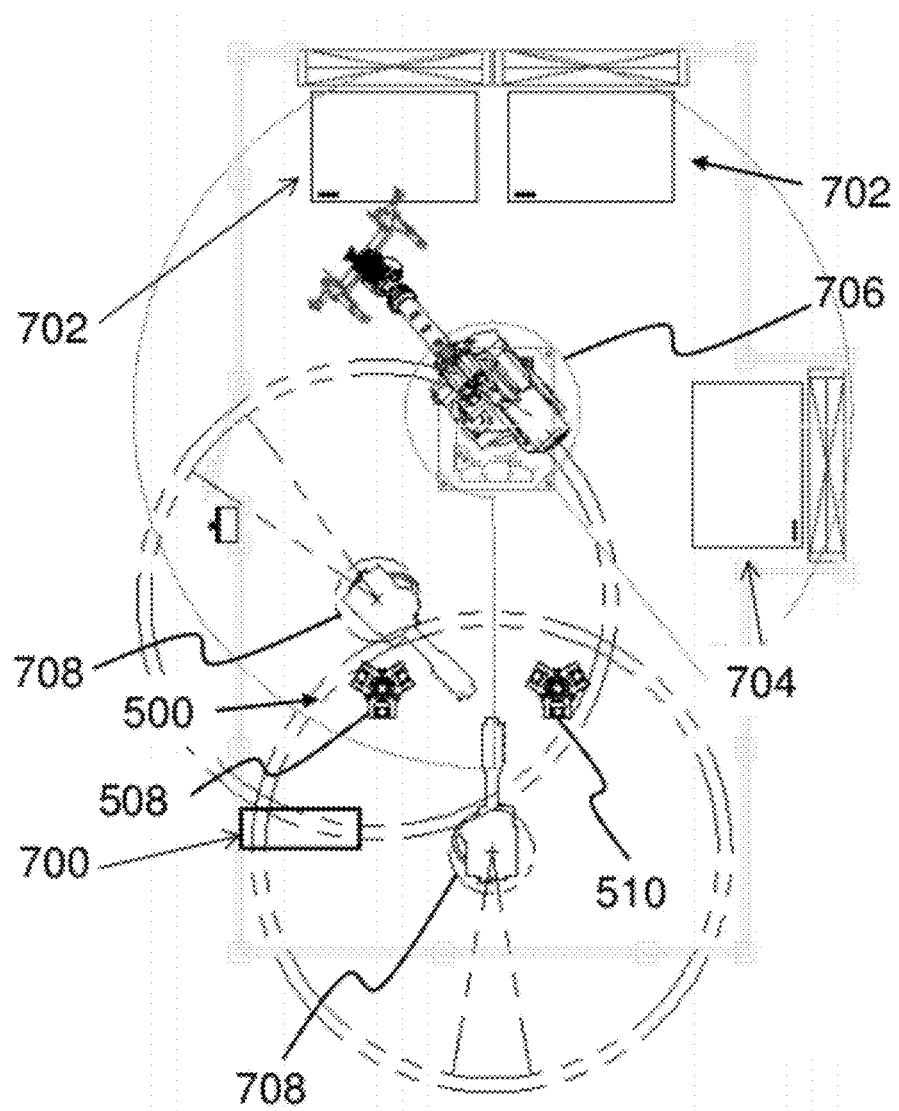
FIG. 7 is a top view showing an assembly station including the clamshell tool of FIGS. 5a-b.

Referring now to FIG. 7, shown is a simplified top view of an assembly station in an assembly line. The assembly station includes the clamshell tool 500 of FIGS. 5a-b. Optionally, the assembly station includes the clamshell tool 400 of FIGS. 4a-4b. Also disposed within the assembly station is a bin 700 for storage of the replaceable squeezers 528a/b (or 428a/b) and the sleeves 520/522 (or 420/422). Storage bins 702 for storing the first and second clamshell components 502/504 (or 402/404, 602/604 or 608/610, etc.) and storage bin 704 for storing finished components are also provided within the assembly station. During use, transfer robot 706 picks up the second clamshell component part 504 from one of the bins 702, and aligns locator features of the second clamshell component part 504 with first and second locator members that are mounted on the first and second bases 508 and 510, respectively, of the clamshell tool 500. One of the weld robots 708 picks up sleeves from the bin 700, and subsequently places one sleeve over each of the first and second locator members. The transfer robot then picks up the first clamshell component part 502 from one of the bins 702, and aligns locator features of the first clamshell component part 502 with the first and second locator members. The weld robot 708 subsequently places clamps over each of the first and second locator members, so as to secure the first clamshell component part 502 relative to the second clamshell component part 504. A not illustrated squeezer assembly is actuated, so as to move each squeezer unit of a pair of replaceable squeezer units into contact with overlapping edge portions along opposite sides of the first and second clamshell component parts. During squeezing, the weld robots 708 join together the first clamshell component part 502 and the second clamshell component part 504, such as for instance by MIG welding or spot welding, etc. When it is necessary to stop forming a first type of clamshell component and begin forming a second type of clamshell component, the bases 508 and 510 are reconfigured and/or a current pair of replaceable squeezer units is detached and replaced with a different pair of replaceable squeezer units. For instance, at least one of a separation between the bases 508 and 510 and a height of one of the bases 508 relative to the other one of the bases 510 is varied. More particularly, reconfiguring the bases 508 and 510 results in the first and second locator members being moved between a first configuration for engaging locator features of the first type of clamshell component and a second configuration for engaging locator features of the second type of clamshell component. Similarly, when the first and second types of clamshell components have different contours along the portions that are being joined together, the current pair of replaceable squeezer units must be replaced with a different pair of replaceable squeezer units that is designed to conform to the contours of the second type of clamshell component.

Figure 8:
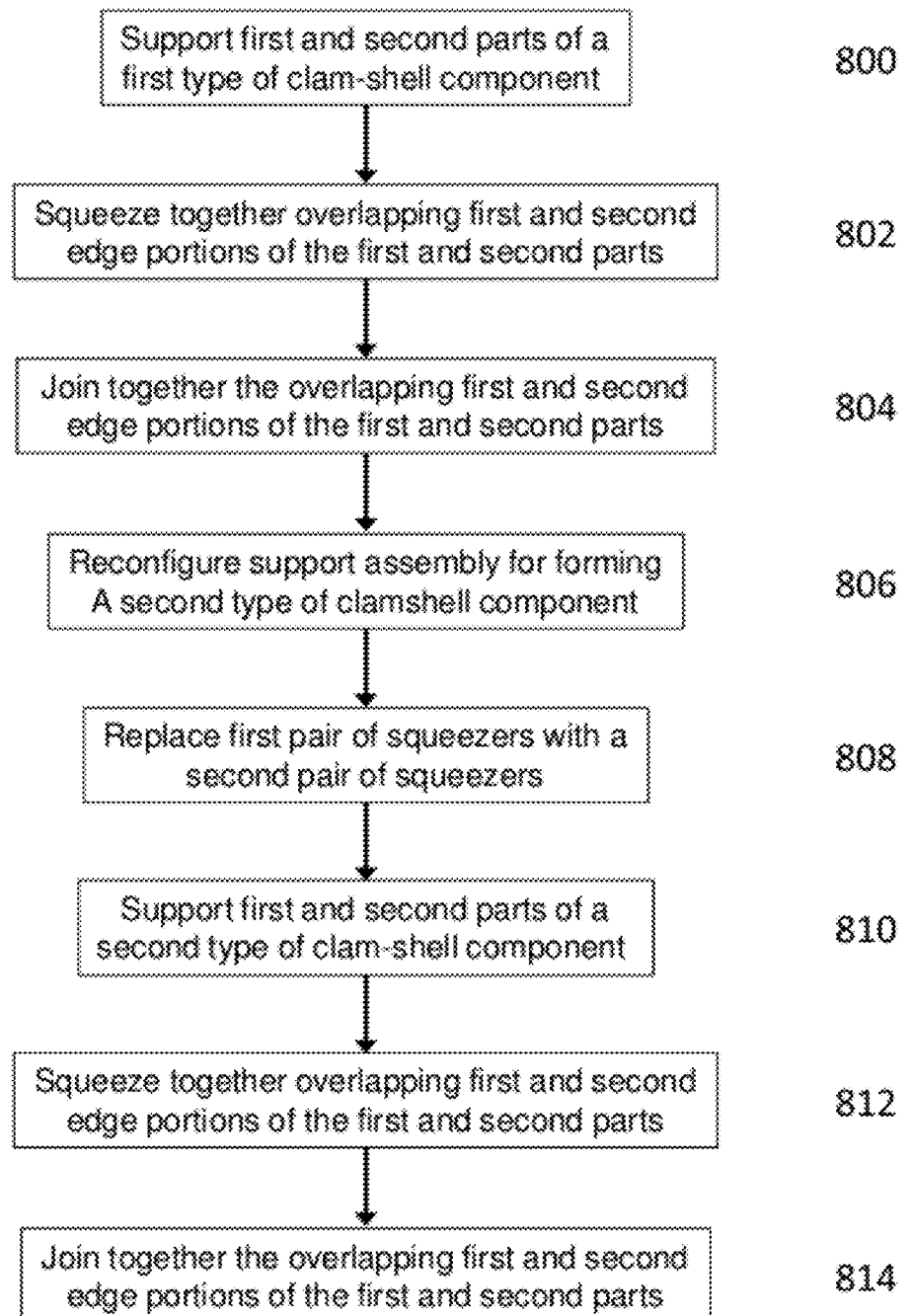
FIG. 8 is a simplified flow diagram of an exemplary method according to the present invention; and, FIG. 9 is a simplified flow diagram of another exemplary method according to the present invention.

Referring now to FIG. 8, shown is a simplified flow diagram of a method according to an embodiment of the instant invention. At 800, first and second parts of a first type of clamshell component are supported, such that first and second locator features of each of the first and second parts engage first and second locator members, respectively, of a support assembly. Further, the first and second parts of the first type of clamshell component are supported such that first and second edge portions of the first part are aligned with respective first and second edge portions of the second part in an overlapping arrangement. At 802 the overlapping first and second edge portions of the first and second parts of the first type of clamshell component are squeezed together, using a first pair of squeezer units mounted on a squeezer. At 804, during squeezing, the first and second parts of the first type of clamshell component are joined together so as to form the first type of clamshell component. At 806, subsequent to removing the first type of clamshell component, the first locator member is moved relative to the second locator member so as to reconfigure the support assembly for forming a second type of clamshell component. At 808 the first pair of squeezer units is replaced with a second pair of squeezer units, the second pair of squeezer units having contacting surfaces that are configured for squeezing together first and second parts of the second type of clamshell component. At 810 first and second parts of the second type of clamshell component are supported, such that first and second locator features of each of the first and second parts engage the first and second locator members, respectively, of the support assembly. Further, the first and second parts of the second type of clamshell component are supported such that first and second edge portions of the first part are aligned with respective first and second edge portions of the second part in an overlapping arrangement. At 812 the overlapping first and second edge portions of the first and second parts of the second type of clamshell component are squeezed together, using the second pair of squeezer units mounted on the squeezer. At 814, during squeezing, the first and second parts of the second type of clamshell component are joined together so as to form the second type of clamshell component.

Figure 9:
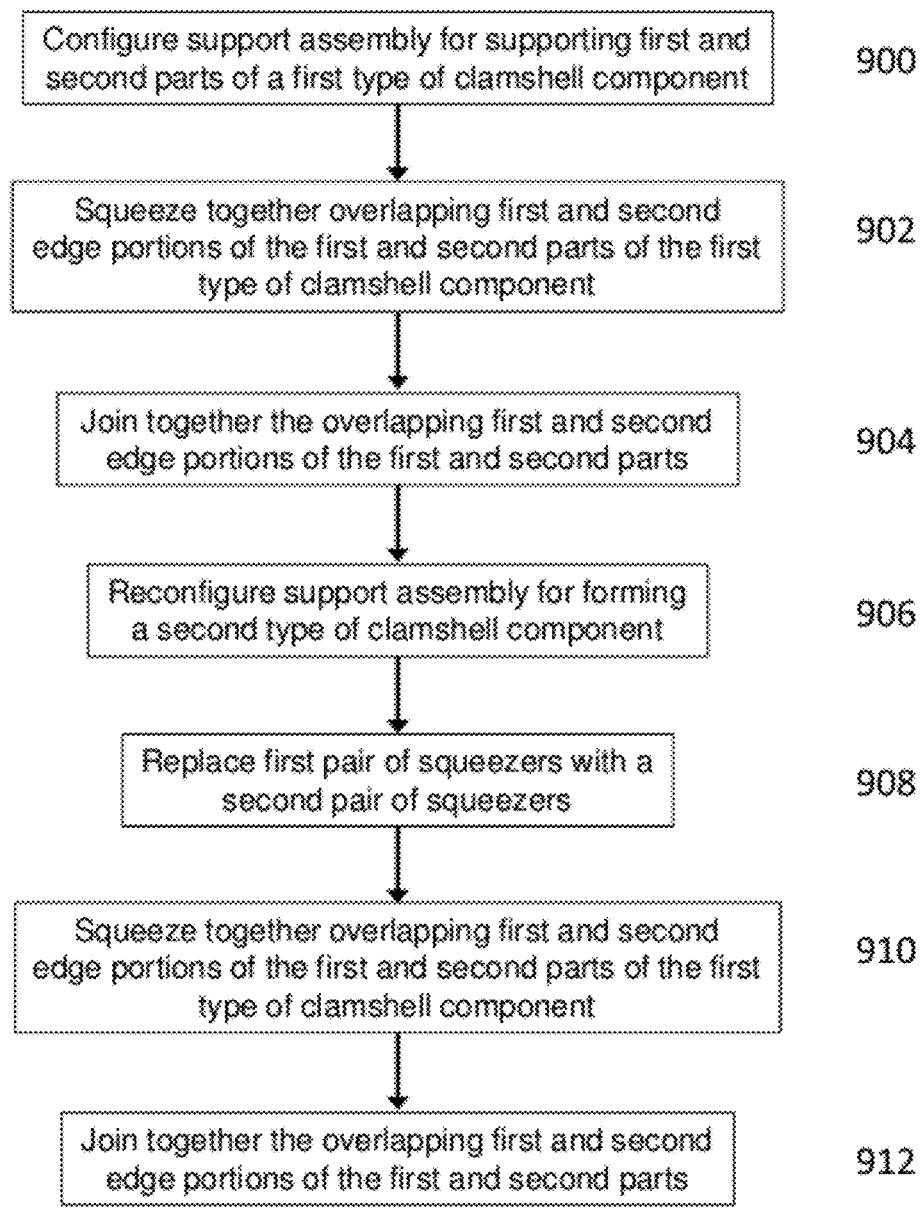

Referring now to FIG. 9, shown is a simplified flow diagram of a method according to an embodiment of the instant invention. At 900 a support assembly is configured for locating first and second parts of a first type of clamshell component, such that first and second edge portions of the first part are aligned with respective first and second edge portions of the second part in an overlapping arrangement. At 902 first and second edge portions of the first and second parts of the first type of clamshell component are squeezed together using a first pair of squeezer units mounted on a squeezer. At 904, during squeezing, the first and second parts of the first type of clamshell component are joined together so as to form the first type of clamshell component. At 906 the support assembly is re-configured for locating first and second parts of a second type of clamshell component, such that first and second edge portions of the first part are aligned with respective first and second edge portions of the second part in an overlapping arrangement. At 908 the first pair of squeezer units is replaced with a second pair of squeezer units, the second pair of squeezer units having contacting surfaces that are configured for squeezing together the first and second parts of the second type of clamshell component. At 910 the first and second edge portions of the first and second parts of the second type of clamshell component are squeezed together using the second pair of squeezer units mounted on the squeezer. At 912, during squeezing, the first and second parts of the second type of clamshell component are joined together so as to form the second type of clamshell component.

The clamshell tools 400 and 500 have replaceable squeezers as well as bases that are moveable one relative to another. By reconfiguring the bases, locator members associated with the bases can be positioned for supporting the clamshell component parts of a wide variety of different types of clamshell components. The steps of reconfiguring the bases, including adjusting a distance between the bases and/or adjusting a height of one of the bases relative to the other, may be performed in an automated fashion under the control of a suitable controller such as for instance a programmable logic circuit, a microprocessor, a personal computer, etc. In this way, different types of clamshell components having different lengths, different locations of piercings, different shapes, etc. can be accommodated. Further, by replacing one set of squeezers that is customized for forming one clamshell component with another set of squeezers that is customized for forming a different clamshell component, it is possible to ensure that the welds between the component parts are formed without any gaps, even for different types of clamshell components. Replacing the squeezers also may be performed in an automated fashion under the control of a suitable controller such as for instance a programmable logic circuit, a microprocessor, a personal computer, etc. Simply reconfiguring the bases and interchanging the squeezers of a clamshell tool, instead of replacing the entire clamshell tool with a different clamshell tool, results in minimal lost productivity time, reduces capital costs, and eliminates the problem of storing several different clamshell assembly tools.

It should be appreciated that the foregoing description is intended to be illustrative in nature and that the present invention includes various modifications, changes, and equivalents thereof, without departure from the scope of the invention.

What is claimed is:

1. A system for forming a plurality of different types of clamshell components, comprising:
   a plurality of interchangeable squeezer units comprising a first pair of squeezer units for use during forming of a first type of clamshell component and a second pair of squeezer units for use during forming of a second type of clamshell component, each squeezer unit having a first mounting structure and having a contacting surface;
   a squeezer assembly having a pair of second mounting structures, each one of the pair of second mounting structures for detachably coupling with the first mounting structure of one of the squeezer units of the first pair of squeezer units during forming of the first type of clamshell component and for detachably coupling with the first mounting structure of one of the squeezer units of the second pair of squeezer units during forming of the second type of clamshell component;
   a support assembly comprising a first locator member and a second locator member, the first locator member controllably movable relative to the second locator member, the support assembly being adjustable between a first configuration in which the first locator member and the second locator member are disposed one relative to the other for locating first and second parts of the first type of clamshell component between the contacting surfaces of the first pair of squeezer units and a second configuration in which the first locator member and the second locator member are disposed one relative to the other for locating first and second parts of the second type of clamshell component between the contacting surfaces of the second pair of squeezer units; and
   wherein the squeezer assembly includes a drive mechanism, and at least one squeezer arm and wherein said drive mechanism is coupled to the at least one squeezer arm, for moving the squeezer units of the first pair of squeezer units one toward the other such that the contacting surfaces thereof are brought into contact with at least one of the first and second parts of the first type of clamshell component during forming of the first type of clamshell component, and for moving the squeezer units of the second pair of squeezer units one toward the other such that the contacting surfaces thereof are brought into contact with at least one of the first and second parts of the second type of clamshell component during forming of the second type of clamshell component.

2. The system according to claim 1, wherein the first locator member and the second locator member are arranged one relative to the other in the first configuration for locating the first and second parts of the first type of clamshell component such that first and second edge portions of the first part are aligned with respective first and second edge portions of the second part in an overlapping arrangement, and wherein the first locator member and the second locator member are arranged one relative to the other in the second configuration for locating the first and second parts of the second type of clamshell component such that first and second edge portions of the first part are aligned with respective first and second edge portions of the second part in an overlapping arrangement.

3. The system according to claim 2, wherein the first locator member is controllably movable relative to the second locator member along a first direction in a horizontal plane for varying a distance between the first locator member and the second locator member.

4. A system according to claim 3, for forming a plurality of different types of clamshell components, comprising:
   a plurality of interchangeable squeezer units comprising a first pair of squeezer units for use during forming of a first type of clamshell component and a second pair of squeezer units for use during forming of a second type of clamshell component, each squeezer unit having a first mounting structure and having a contacting surface;
   a squeezer assembly having a pair of second mounting structures, each one of the pair of second mounting structures for detachably coupling with the first mounting structure of one of the squeezer units of the first pair of squeezer units during forming of the first type of clamshell component and for detachably coupling with the first mounting structure of one of the squeezer units of the second pair of squeezer units during forming of the second type of clamshell component;
   a support assembly comprising a first locator member and a second locator member, the first locator member controllably movable relative to the second locator member, the support assembly being adjustable between a first configuration in which the first locator member and the second locator member are disposed one relative to the other for locating first and second parts of the first type of clamshell component between the contacting surfaces of the first pair of squeezer units and a second configuration in which the first locator member and the second locator member are disposed one relative to the other for locating first and second parts of the second type of clamshell component between the contacting surfaces of the second pair of squeezer units;

wherein the first locator member and the second locator member are arranged one relative to the other in the first configuration for locating the first and second parts of the first type of clamshell component such that first and second edge portions of the first part are aligned with respective first and second edge portions of the second part in an overlapping arrangement, and wherein the first locator member and the second locator member are arranged one relative to the other in the second configuration for locating the first and second parts of the second type of clamshell component such that first and second edge portions of the first part are aligned with respective first and second edge portions of the second part in an overlapping arrangement;

wherein the squeezer assembly includes a drive mechanism, and at least one squeezer arm and wherein said drive mechanism is coupled to the at least one squeezer arm, for moving the squeezer units of the first pair of squeezer units one toward the other such that the contacting surfaces thereof are brought into contact with at least one of the first and second parts of the first type of clamshell component during forming of the first type of clamshell component, and for moving the squeezer units of the second pair of squeezer units one toward the other such that the contacting surfaces thereof are brought into contact with at least one of the first and second parts of the second type of clamshell component during forming of the second type of clamshell component; and wherein the first locator member is controllably movable relative to the second locator member along a first direction in a horizontal plane for varying a distance between the first locator member and the second locator member and along a second direction that is normal to the horizontal plane, for varying a height of the first locator member relative to a height of the second locator member.

5. The system according to claim 1, wherein the support assembly comprises a first base and a second base, the first base controllably movable relative to the second base, the first locator member being fixedly secured to the first base and the second locator member being fixedly secured to the second base.

6. The system according to claim 5, wherein the first base is a first hexapod robot and the second base is a second hexapod robot.

7. The system according to claim 1, wherein the first locator member comprises a first locator pin and the second locator member comprises a second locator pin.

8. A system according to claim 7, for forming a plurality of different types of clamshell components, comprising:

a plurality of interchangeable squeezer units comprising a first pair of squeezer units for use during forming of a first type of clamshell component and a second pair of squeezer units for use during forming of a second type of clamshell component, each squeezer unit having a first mounting structure and having a contacting surface;

a squeezer assembly having a pair of second mounting structures, each one of the pair of second mounting structures for detachably coupling with the first mounting structure of one of the squeezer units of the first pair of squeezer units during forming of the first type of clamshell component and for detachably coupling with the first mounting structure of one of the squeezer units of the second pair of squeezer units during forming of the second type of clamshell component;

a support assembly comprising a first locator member and a second locator member, the first locator member controllably movable relative to the second locator member, the support assembly being adjustable between a first configuration in which the first locator member and the second locator member are disposed one relative to the other for locating first and second parts of the first type of clamshell component between the contacting surfaces of the first pair of squeezer units and a second configuration in which the first locator member and the second locator member are disposed one relative to the other for locating first and second parts of the second type of clamshell component between the contacting surfaces of the second pair of squeezer units;

wherein the squeezer assembly includes a drive mechanism, and at least one squeezer arm and wherein said drive mechanism is coupled to the at least one squeezer arm, for moving the squeezer units of the first pair of squeezer units one toward the other such that the contacting surfaces thereof are brought into contact with at least one of the first and second parts of the first type of clamshell component during forming of the first type of clamshell component, and for moving the squeezer units of the second pair of squeezer units one toward the other such that the contacting surfaces thereof are brought into contact with at least one of the first and second parts of the second type of clamshell component during forming of the second type of clamshell component;

wherein the first locator member comprises a first locator pin and the second locator member comprises a second locator pin; and wherein during forming of the first type of clamshell component the first locator member further comprises a first sleeve that is set onto the first locator pin and a second sleeve that is set onto the second locator pin, each of the first and second sleeves having a predetermined length and being disposed between facing inner-surfaces of the first and second parts of the first type of clamshell component for providing a predetermined first separation therebetween, and wherein during forming of the second type of clamshell component the first locator member further comprises a third sleeve that is set onto the first locator pin and a fourth sleeve that is set onto the second locator pin, each of the third and fourth sleeves having a predetermined length and being disposed between facing inner-surfaces of the first and second parts of the second type of clamshell component for providing a predetermined second separation therebetween.

9. The system according to claim 1, wherein each squeezer unit of the plurality of interchangeable squeezer units includes a machine-readable identification tag.

10. The system according to claim 1, wherein the contacting surface of one of the squeezer units of the first pair of squeezer units is disposed in a spaced-apart facing arrangement with the contacting surface of the other one of the squeezer units of the first pair of squeezer units when the first pair of squeezer units is mounted on the squeezer assembly, and wherein the contacting surface of one of the squeezer units of the second pair of squeezer units is disposed in a spaced-apart facing arrangement with the contacting surface of the other one of the squeezer units of the second pair of squeezer units when the second pair of squeezer units is mounted on the squeezer assembly.

* * * * *